(12) United States Patent
Uono et al.

(10) Patent No.: US 8,697,285 B2
(45) Date of Patent: Apr. 15, 2014

(54) NEGATIVE ELECTRODE MATERIAL FOR NONAQUEOUS SECONDARY BATTERY

(75) Inventors: Hiroyuki Uono, Ibaraki (JP); Hideharu Sato, Ibaraki (JP); Hitoshi Matsumoto, Ibaraki (JP); Atsuyoshi Inoue, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 341 days.

(21) Appl. No.: 13/126,968

(22) PCT Filed: Oct. 30, 2009

(86) PCT No.: PCT/JP2009/068705
§ 371 (c)(1),
(2), (4) Date: Jul. 8, 2011

(87) PCT Pub. No.: WO2010/050595
PCT Pub. Date: May 6, 2010

(65) Prior Publication Data
US 2011/0262802 A1   Oct. 27, 2011

(30) Foreign Application Priority Data
Oct. 31, 2008  (JP) .............................. P. 2008-282025

(51) Int. Cl.
*H01M 4/133*  (2010.01)
(52) U.S. Cl.
USPC ..................................................... 429/231.4
(58) Field of Classification Search
None
See application file for complete search history.

(56) References Cited

U.S. PATENT DOCUMENTS 6,632,569 B1   10/2003   Kameda et al.

FOREIGN PATENT DOCUMENTS

| CN | 101208819 A | 6/2008 |
| EP | 0 549 802 | 6/1992 |
| EP | 0 698 933 A1 | 2/1996 |
| EP | 1 939 971 | 10/2006 |
| JP | 09 241013 | 9/1997 |
| JP | 2000 223120 | 8/2000 |
| JP | 2003 168432 | 6/2003 |
| JP | 2008 181870 | 8/2008 |
| WO | WO 2008/084675 A1 | 7/2008 |

OTHER PUBLICATIONS

Office Action and Search Report issued Apr. 17, 2013 in Chinese Patent Application No. 200980143281.3 (with English language translation).
Office Action issued on Oct. 21, 2013 in Chinese Application No. 200980143281.3 and English Translation thereof.
Extended European Search Report issued on Dec. 18, 2013 in the corresponding European patent application.
International Search Report issued Dec. 22, 2009 in PCT/JP09/68705 filed Oct. 30, 2009.

*Primary Examiner* — Patrick Ryan
*Assistant Examiner* — Wyatt McConnell
(74) *Attorney, Agent, or Firm* — Oblon, Spivak, McClelland, Maier & Neustadt, L.L.P.

(57) ABSTRACT

To provide a carbon material capable of suppressing excessive reactivity with an electrolytic solution and excellent in a rapid charge/discharge characteristics.
A carbon material for lithium ion secondary batteries, which satisfies: (i) a tap density$\geq 0.75$ g/cm$^3$; (ii) a Raman R value$\geq 0.23$ and a half width of D band $\Delta v_D < 45$ cm$^{-1}$, in which the D band appears in the vicinity of 1,358 cm$^{-1}$ of the Raman spectrum; and (iii) 4 m$^2$/g$\leq$BET specific surface area (SA)$\leq 11$ m$^2$/g.

20 Claims, No Drawings

NEGATIVE ELECTRODE MATERIAL FOR NONAQUEOUS SECONDARY BATTERY

TECHNICAL FIELD

The present invention relates to a carbon material for use in a lithium ion secondary battery, a negative electrode sheet formed using the carbon material, and a lithium ion secondary battery containing the negative electrode sheet.

BACKGROUND ART

Recently, with miniaturization of electronic devices, demands for a high-capacity secondary battery are increasing. In particular, a lithium ion secondary battery having a high energy density and excellent large-current charge/discharge characteristics as compared with a nickel-cadmium battery or a nickel-hydrogen battery is attracting attention.

As for the negative electrode material of a lithium ion secondary battery, a graphite material or an amorphous carbon is often used in view of cost and durability. However, the reversible capacity of the amorphous carbon material is low as long as practically applicable materials are concerned, or the graphite material has a problem that when the active material layer containing a negative electrode material is highly densified so as to obtain high capacity, the charge/discharge irreversible capacity in the initial cycle increases due to material fracture, failing in obtaining high capacity.

In order to solve such a problem, for example, a technique of heat-treating the graphite material is known. Patent Document 1 discloses heat-treating scale graphite at 400 to 1,800° C. in an argon atmosphere. Patent Document 2 discloses heat-treating graphite at a temperature over 2,400° C. Patent Document 3 discloses heat-treating scale graphite at 900° C. or less to have a rhombohedral structure fraction of 20% or less in the graphite. Patent Document 4 discloses treating natural graphite at 2,000° C. in an inert atmosphere. The techniques disclosed in these patent documents, where scale graphite is used as the raw material, are expected to achieve reduction in the irreversible capacity attributable to a negative electrode material, which would be obtained by heat treatment, but requirement for rapid charge/discharge characteristics, arising with increase in the negative electrode density, is not sufficiently responded to.

Also, Patent Document 5 discloses a negative electrode material caused to have a ringed structure composed of two or more layers on an end face by a heat treatment. In this negative electrode material, the reactivity with an electrolytic solution is suppressed, but the end face allowing for entrance and exit of Li is also closed by a heat treatment at ≥2,500° C. and therefore, the rapid charge/discharge characteristics are still insufficient.

Patent Document 6 discloses a graphite particle in which the amount of an acidic functional group is 5 milliequivalent/kg or less and 0.3 µmol/m² or less. Patent Document 7 discloses graphite in which the Tap density is from 0.8 to 1.35 g/cm³, the abundance ratio O/C of oxygen to carbon determined by XPS is less than 0.01, the specific surface area SA determined using $N_2$ is from 2.5 to 7 m²/g or less, and the Raman R value is from 0.02 to 0.05. In Patent Documents 6 and 7, a spheroidized graphite particle is used, but the amount of an acidic functional group is too small and rapid charge/discharge characteristics surpassing the spheroidized graphite as the raw material can be hardly obtained, though an effect of reducing irreversible capacity may be expected similarly to the above-described techniques of heat-treating scale graphite.

Furthermore, Patent Document 8 discloses a particle obtained by rapidly heating and rapidly cooling a spheroidized graphite particle in a non-oxidizing atmosphere. However, as described later, the crystal structure on the end face of graphite is insufficiently changed by the rapid heat treatment and the effect of responding to rapid charge/discharge characteristics is lacking.

In this way, there is conventionally a trade-off relationship in the graphite-based material, that is, when the end face of a graphite particle is inactivated so as to suppress an excessive reaction between an electrolytic solution and the particle, the rapid charge acceptance characteristics tend to be deteriorated, whereas for enhancing the rapid charge acceptance characteristics, the specific surface area must be increased and this involves an excess consumption of electrolytic solution and gives rise to electrolyte depletion or the like. The carbon material of the present invention can satisfy both of these characteristic features that have been heretofore considered contradictory, and can achieve both rapid charge/discharge characteristics and reduction in the irreversible capacity.

Also, in general, a negative electrode using an amorphous carbon material as the active material is excellent in the rapid charge/discharge characteristics of Li. However, there is a problem that since the potential curve during charging passes through a noble potential compared with the potential curve of a graphite material, a potential difference with the positive electrode cannot be created when a battery is fabricated. Furthermore, the amorphous carbon material lacks in slipperiness at the electrode rolling and therefore, is improper when producing a high-density negative electrode with an aim to obtain high capacity.

CONVENTIONAL ART

Patent Document

Patent Document 1: Japanese Patent No. 3,233,417
Patent Document 2: Japanese Patent No. 3,188,032
Patent Document 3: JP-A-8-287910 (the term "JP-A" as used herein means an "unexamined published Japanese patent application")
Patent Document 4: JP-A-8-96797
Patent Document 5: International Publication No. 98/29335, pamphlet
Patent Document 6: JP-A-2005-108456
Patent Document 7: JP-A-2006-49288
Patent Document 8: JP-A-2004-111110

SUMMARY OF THE INVENTION

Problems that the Invention is to Solve

Under these circumstances, the present invention has been made, and an object of the present invention is to provide a carbon material which is a particle ensuring that when the carbon material is contained as the active material in a negative electrode, the irreversible capacity in the initial cycle is small and the rapid charge/discharge characteristics can be responded to, and thereby establish a negative electrode system capable of operating even when a polar plate sheet is prepared in a high density. Another object of the present invention is to provide a carbon material capable of being easily and simply produced through a small number of production steps. Still another object of the present invention is to provide a carbon material which can maintain rollability of the graphite material and in turn, can be coated on a current collector in a high density and be utilized as a negative electrode material when fabricating a high-capacity lithium ion secondary battery.

Means for Solving the Problems

As a result of intensive studies to attain the above-described objects, a graphite-based particle having a specific outermost surface structure can be produced by using, as the raw material, a graphite particle having a specific structure and specific physical properties and heat-treating it in a given temperature range while taking time for the temperature to rise or drop. It has been found that the graphite-based particle having this structure can suppress excessive reactivity with an electrolytic solution and at the same time, can be used as an active material excellent in rapid charge/discharge characteristics.

That is, the gist of the present invention is as follows.

(1) A carbon material for lithium ion secondary batteries, which satisfies: (i) a tap density $\geq 0.75$ g/cm$^3$; (ii) a Raman R value$\geq 0.23$ and a half width of D band $\Delta v_D < 45$ cm$^{-1}$, in which the D band appears in the vicinity of 1,358 cm$^{-1}$ of the Raman spectrum; and (iii) 4 m$^2$/g$\leq$BET specific surface area (SA)$\leq$11 m$^2$/g.

(2) The carbon material for lithium ion secondary batteries as described in (1) above, wherein an element ratio of oxygen (O) to carbon (C) determined by X-ray photoelectron spectroscopy (XPS) is 0.03<O/2.4.

(3) The carbon material as described in (1) or (2) above, wherein a thickness of an amorphous carbon layer present on a basal surface exposed to a particle surface observed by a transmission electron microscope (TEM) does not exceed 50 nm.

(4) The carbon material as described in any one of (1) to (3) above, wherein the particle observed by TEM has, in the edge portion, a structure composed of a single layer or maximally two layers, in which edge surfaces exposed to the particle surface are connected with each other to form a U-shaped curved surface, and has a fine folded structure irregular in the a-axis direction.

(5) The carbon material as described in any one of (1) to (4) above, wherein pH of the water slurry is 7.5 or more and less than 11.

(6) The carbon material as described in any one of (1) to (5) above, wherein the particle observed by a scanning electron microscope (SEM), is natural graphite giving a spherical shape as a whole, and the particle observed by TEM has a structure composed of a single layer or maximally two layers, in which edge surfaces exposed to the particle surface are connected with each other to form a U-shaped curved surface, and has a fine folded structure irregular in the a-axis direction.

(7) The carbon material as described in any one of (1) to (4) above, wherein the Raman R value is not less than the Raman R value of the raw material graphite particle, and Rr (Raman R value of the carbon material/Raman R value of the raw material graphite particle) is 1.0<Rr$\leq$1.5.

(8) The carbon material as described in any one of (1) to (6) above, wherein the half width $\Delta v_D$ of D band appearing in the vicinity of 1,358 cm$^{-1}$ of the Raman spectrum is not more than the half width $\Delta v_D$ of D band of the raw material graphite particle, and the ratio $\Delta v_D$r therebetween ($\Delta v_D$ of the carbon material/$\Delta v_D$ of the raw material graphite particle) is $\Delta v_D$r$\leq$0.99.

(9) The carbon material as described in any one of (1) to (6) above, wherein the BET specific surface area (SA) is larger than SA of the raw material graphite particle, the ratio SA_r therebetween (SA of the carbon material/SA of the raw material graphite particle) is 1.03$\leq$SA_r$\leq$1.5, the tap density is larger than the tap density of the raw material graphite particle, and the ratio Tap_r therebetween (tap density of the carbon material/tap density of the raw material graphite particle) is 1.01$\leq$Tap_r$\leq$1.3.

(10) The carbon material as described in any one of (1) to (9) above, which is a carbon material obtained by heat-treating a spherical or spheroidal natural graphite particle having a tap density$\geq 0.6$ g/cm$^3$ in $N_2$, wherein after the heat treatment step, a weight increase occurs due to an $N_2$ addition reaction.

(11) The carbon material as described in (10) above, wherein the heat treatment temperature T in the heat treatment step is 500° C.$\leq$T<1,250° C. and the time for the heat treatment is 36 hours or more.

(12) The carbon material as described in any one of (1) to (11) above, wherein the ratio of an irreversible capacity to the SA is 4.5 (mAh/m$^2$) or less, in which the irreversible capacity is measured by using the carbon material as an electrode active material of a lithium ion secondary battery and performing a sweep for three cycles with an Li counter electrode in the interelectrode potential difference range from 0 to 1.5 V while setting the density of the active material to 1.7 g/cm$^3$.

(13) The carbon material as described in any one of (1) to (12) above, which has no amorphous carbon structure attributable to a heat-treated product of pitch, tar or resin.

(14) The carbon material as described in any one of (1) to (13) above, wherein the raw material graphite particle is a spherical natural graphite particle, and the total CO generation amount on the surface of the raw material graphite particle as determined by temperature-programmed desorption method (TPD-MS) measurement and SA measurement, is from 0.4 to 3.5 μmmol/m$^2$.

(15) A carbon material comprising: the carbon material described in any one of (1) to (14) above; and a negative electrode carbon material other than that in a ratio of 2:8 to 9:1 (by mass).

(16) A negative electrode sheet comprising the carbon material described in any one of (1) to (15) above as a negative electrode active material.

(17) A lithium ion secondary battery comprising the negative electrode sheet described in (16) above.

(18) A lithium ion secondary battery comprising: a negative electrode containing the carbon material described in any one of (1) to (15) above in a negative electrode sheet; a positive electrode; and an electrolytic solution, wherein the active material density of the negative electrode sheet is 1.6 g/cm$^3$ or more and the electrolytic solution contains a chain carbonate.

Advantage of the Invention

The carbon material of the present invention is a particle ensuring that when the carbon material is contained as the active material in a negative electrode, the irreversible capacity in the initial cycle is small and the rapid charge/discharge characteristics can be responded to. Also, the carbon material of the present invention can establish a negative electrode system capable of operating even when a polar plate sheet is prepared in a high density.

Also, the carbon material of the present invention can be easily and simply produced because of a small number of production steps. Furthermore, the carbon material of the present invention can maintain rollability of the graphite material and in turn, can be coated on a current collector in a high density and be utilized as a negative electrode material when fabricating a high-capacity lithium ion secondary battery.

MODE FOR CARRYING OUT THE INVENTION

The present invention is described in detail below. Incidentally, the following descriptions of constitutional requirements of the invention are an example (a representative example) of the embodiment of the present invention, and the present invention is not limited to these modes as long as the gist thereof is observed.

[Tap Density]
(i) Definition of Tap Density

The tap density can be measured by a conventionally known method. Specifically, for example, the tap density is measured as follows. Using a powder density measuring device (Tap Denser KYT-4000, manufactured by Seishin Enterprise Co., Ltd.), the cylindrical tap cell having a diameter of 1.6 cm and a volume capacity of 20 cm$^3$ is filled up with composite graphite particles falling through a sieve having a sieve opening of 300 μm and after tapping 1,000 times with a stroke length of 10 mm, the density is determined from the volume here and the weight of the sample and defined as the tap density.

(ii) Preferred Range

The tap density of the carbon material of the present invention is preferably 0.75 g/cm$^3$ or more, more preferably 0.90 g/cm$^3$ or more, still more preferably 0.95 g/cm$^3$ or more, and is preferably 1.25 g/cm$^3$ or less, more preferably 1.20 g/cm$^3$ or less. If the tap density is less than 0.75 g/cm$^3$, the high-speed charge/discharge characteristics are poor, whereas if the tap density exceeds 1.25 g/cm$^3$, the carbon density in a particle is increased and rollability becomes lacking, making it difficult to form a high-density negative electrode sheet.

In the carbon material of the present invention, the tap density measured by the method above is preferably larger than that of the later-described graphite particle used as a raw material (hereinafter sometimes referred to as a "raw material graphite particle") and the ratio Tap_r therebetween (tap density of the carbon material/tap density of the raw material graphite particle) is preferably $1.01 \leq \text{Tap\_r} \leq 1.3$. If Tap_r is less than 1.01, the firing effect is insufficient, whereas if Tap_r exceeds 1.3, there arises a problem in the electrical conductivity between particles.

[Raman R Value]
(i) Method for Measuring Raman Spectrum

The Raman spectrum can be measured by a conventionally known method. Specifically, for example, the Raman spectrum is measured as follows. Using a Raman spectrometer (manufactured by JASCO Corp.), the measurement target particles are caused to freely fall in and fill the measurement cell, and the measurement is performed under the following conditions while irradiating argon ion laser light in the measurement cell and rotating the measurement cell in a plane perpendicular to the laser light.

Wavelength of argon ion laser light: 514.5 nm
Laser power on sample: 20 mW
Resolution: 15 cm$^{-1}$
Measured range: from 1,100 to 1,730 cm$^{-1}$
Measurement of peak intensity, measurement of peak half width: background processing, smoothing processing (5 points in convolution as computed by a simple average)

(ii) Preferred Range and Characteristic Features

The Raman spectrum of the carbon material of the present invention shows a characteristic profile. It is acknowledged that the maximum peak in the vicinity of 1,580 cm$^{-1}$ is a peak (G band) derived from a graphite crystalline structure, and the maximum peak in the vicinity of 1,358 cm$^{-1}$ is a peak (D band) derived from an amorphous carbon atom reduced in the symmetry due to a structural defect. The peak intensity ratio between G band and D band, that is, the Raman R value, is defined by $I_D/I_G$ (F. Tuinstra and J. L. Koenig, *J. Chem. Phys.*, 53, 1126 [1970]).

In conventional understanding, an increase in the crystallinity of graphite leads to a broad G band, and an increase in the non-crystallinity or crystal structure disorder leads to a broad D band. In practice, when amorphous carbon is measured, this usually shows a Raman R value of approximately from 0.4 to 1 and furthermore, the half width $\Delta v_D$ of D band at this time is as large as 50 cm$^{-1}$ or more, making its peak shape broad, although these will vary depending on the heat treatment temperature. Also, as for a graphite-based material, in general, even high-crystalline graphite used as a raw material of the carbon material of the present invention or its spherically ground product usually shows a Raman R value of approximately from 0.1 to less than 0.23, and the $\Delta v_D$ is about 45 cm$^{-1}$, although these will vary depending on the grinding degree or crystallization temperature.

The Raman R value of the carbon material of the present invention is, even when high-crystalline natural graphite or its spherically ground product is used as a raw material, 0.23 or more, typically 0.3 or more, which is equal to or greater than that of the raw material graphite and is a value close to characteristics of amorphous carbon. On the other hand, in the carbon material of the present invention, the half width $\Delta v_D$ of D band appearing in the vicinity of 1,358 cm$^{-1}$ in the Raman spectrum is preferably less than 45 cm$^{-1}$. Thus, it is preferred to show specific properties different from those of both the raw material graphite and the amorphous carbon material.

In the process of producing the carbon material of the present invention, it is not sufficient to merely apply a predetermined heat treatment, but for bringing out the effects of the carbon material of the present invention, the heat treatment time is important and as described later, the heat treatment time is preferably set to 36 hours or more. For example, using a spheroidized natural graphite particle having a particle diameter of 22.2 μm, a tap value of 1.05 and a specific surface area of 5.1 m$^2$/g as obtained by the N$_2$ method, carbon material samples were prepared in a rapid temperature rise/drop mode where the temperature rise, the holding time at a predetermined temperature and the temperature drop were set to temperature rise in 2 hours, temperature holding for 1 hour and temperature drop in 2 hours for each of the processing temperatures of 700° C., 800° C. and 900° C. The Raman R values of the obtained carbon materials were calculated after performing the above-described measurement of Raman spectrum, as a result, the increase of the Raman R value is not so large compared with the raw material graphite. When the carbon material is again heat-treated by further raising the heat treatment temperature of the graphite particle, for example, at 3,000° C., the Raman R value became 0.03, revealing a property close to that of a perfect crystal of graphite, and this was different from the carbon material of the present invention.

The carbon material of the present invention is characterized in that the Raman R value is not less than the Raman R value of a spherical natural graphite particle working out to a raw material of the carbon material and the ratio Rr therebetween (Raman R value of the carbon material/Raman R value of the raw material graphite particle) is $1.0 < \text{Rr} \leq 1.5$. If the value of Rr is less than 1.0, the effects of the present invention of reducing the irreversible capacity and enhancing the charge acceptance are insufficient, whereas if it exceeds 1.5, such a carbon material is usually not obtained.

Also, the carbon material of the present invention is characterized in that the half width $\Delta v_D$ of D band obtained by Raman spectrum measurement is often not more than $\Delta v_D$ of the raw material graphite particle of the carbon material and the ratio $\Delta v_D r$ therebetween ($\Delta v_D$ of the carbon material/$\Delta v_D$ of the raw material graphite particle) is $\Delta v_D r \leq 0.99$. If $\Delta v_D r$ exceeds 0.99, a carbon structure derived from a so-called amorphia obtained by firing an organic material precursor results, and the effect of reducing the irreversible capacity is insufficient.

[BET Specific Surface Area (SA)]
(i) Measuring Method

The BET specific surface area (SA) can be measured by a conventionally known method. Specifically, for example, this is measured using a specific surface area measuring apparatus (AMS8000, manufactured by Ohkura Riken Co., Ltd.) by a BET one-point method according to a nitrogen gas adsorption flow process. That is, 0.4 g of a sample (carbon material) is filled in a cell, pretreated by heating it at 350° C., then cooled to a liquid nitrogen temperature to cause saturated adsorption of a gas consisting of 30% of nitrogen and 70% of He, and heated to room temperature, and from the result obtained by measuring the amount of gas desorbed, the specific surface area is calculated by a normal BET method.

(ii) Preferred Range

The specific surface area of the carbon material of the present invention as measured by the BET method is preferably from 5 to 11 $m^2/g$. The specific surface area is usually 5 $m^2/g$ or more, preferably 6 $m^2/g$ or more, and is usually 11 $m^2/g$ or less, preferably 10 $m^2/g$ or less, more preferably 9 $m^2/g$ or less. If the specific surface area is less than 5 $m^2/g$, the number of portions allowing for entrance and exit of Li is small and high-speed charge/discharge characteristics and output characteristics are poor, whereas if the specific surface area exceeds 11 $m^2/g$, the active material becomes excessively active with the electrolytic solution, making the initial irreversible capacity large, and a high-capacity battery may not be produced.

After heat treatment, the carbon material of the present invention comes to have a larger specific surface area than that of the raw material graphite. This phenomenon is observed also in $N_2$ and therefore, is presumed to be not based on only the oxidation phenomenon on the particle surface but be reflecting the phenomenon described later in the paragraph of Particle Diameter. Also, it is known that in a heat treatment at a higher temperature of 2,000 to 3,000° C., the surface area decreases. Thus, the treatment temperature region used for the carbon material of the present invention has specificity.

In the carbon material of the present invention, it is preferred that the BET specific surface area (SA) as measured by the above-described method is larger than SA of the raw material graphite particle (described later) of the carbon material and the ratio SA_r therebetween (SA of the carbon material/SA of the raw material graphite particle) is $1.03 \leq SA\_r \leq 1.5$. If SA_r is less than 1.03, the carbon structure of the present invention is undeveloped and the effect of enhancing the charge acceptance or reducing the irreversible capacity is insufficient, whereas if it exceeds 1.5, the surface area becomes excessively large and this incurs an increase of substantial irreversible capacity.

[X-Ray Photoelectron Spectroscopy (XPS)]
(i) Measuring Method

The element ratio (O/C) of oxygen to carbon can be determined as follows by X-ray photoelectron spectroscopy (XPS). The X-ray photoelectron spectroscopy (XPS) can be measured by a conventionally known method. Specifically, for example, using an X-ray photoelectron spectrometer (manufactured, for example, by ULVAC-PHI, Inc.), a measurement target particle powder is placed on the sample stage to give a flat surface and then subjected to multiplex measurement using an aluminum Kα-ray, whereby C1s (from 280 to 300 eV) and O1s (from 525 to 545 eV) spectra are obtained. After charge correction by setting the C1s peak top to 284.3 eV, the peak areas of the C1s and O1s spectra are determined and further multiplied by an apparatus sensitivity coefficient to calculate the surface atomic concentration of each of C and O. The ratio between the atomic concentrations obtained (O/C: atomic concentration of O)/(atomic concentration of C) is calculated and defined as the amount of surface functional groups, O/C value, of the negative electrode material.

(ii) Preferred Range

The element ratio of oxygen to carbon (O/C) as determined by XPS of the carbon material of the present invention is preferably more than 0.03 to 2.4, more preferably from 0.2 to 1, and most preferably from 0.3 to 0.8. If the element ratio of oxygen to carbon (O/C) is 0.03 or less, the carbon structure on the outermost surface of the particle is excessively developed to lack in high-speed charge/discharge characteristics, whereas if it exceeds 2.4, reduction of the irreversible capacity is insufficient.

[Transmission Electron Microscope (TEM) Measurement]
(i) Measuring Method

The transmission electron microscope (TEM) measurement can be performed by a conventionally known method. Specifically, for example, a particle powder is dispersed in ethanol to prepare a sample, and the sample is dropped on a grid and observed using a transmission electron microscope (JEM-2010, manufactured by JEOL Ltd.) under the condition of an accelerating voltage of 200 kV by taking notice of the edge portion.

(ii) Preferred Particle Morphology

The carbon material of the present invention preferably shows the following specific structure when observing the edge end face with a visual field of about 2,000,000 times by TEM. It is preferred that when the carbon material of the present invention is observed by TEM, crystal development in the direction perpendicular to the basal surface of the carbon particle, which is attributable to amorphous carbon, is scarcely recognized on the surface. This is because in the carbon material of the present invention, a so-called carbon precursor such as pitch, tar and resin is not used as a raw material.

In the carbon material of the present invention, the particle observed by TEM preferably satisfies the condition that even when a crystal derived from the substrate graphite is partially disordered, the thickness of an amorphous carbon layer present in the Lc (c-axis) direction on the basal surface exposed to the particle surface does not exceed 50 nm.

Also, in the carbon material of the present invention, it is preferred that the particle observed by TEM does not hold, in the edge end part, "a regularly ringed structure" which indicates a hollow structure composed of multiple layers, typically 4 or more layers, described in JP-A-10-226505 and JP-A-10-226506, FIG. 2.

Furthermore, in the carbon material of the present invention, the particle observed by TEM preferably has, in the edge portion, a structure composed of a single layer or maximally two layers each resulting from edge surfaces exposed to the particle surface being connected with each other to form a U-shaped curved surface and has a structure (folded structure) giving a fine Zig-Zag surface that is irregular by 100 nm or less in the La (a-axis) direction. If the raw material graphite does not have such a structure, the irreversible capacity is increased and the charge acceptance is poor. Therefore, the above-described specific structure is considered to reduce the reactivity with an electrolytic solution and at the same time, favorably affect the entrance and exit of Li.

[pH of Water Slurry]
(i) Measuring method

The pH of the water slurry of the carbon material can be measured by a conventionally known method. Specifically, for example, 300 g of carbon particle to be measured is charged into a 1 L-volume glass beaker together with 300 g in pure water, and these are mixed under boiling for 30 minutes. Once the carbon particle is mixed with water, the slurry is left standing still and gradually cooled. After the temperature reaches 25° C., a glass electrode for pH measurement is gently dropped in the supernatant solution, and the measurement is performed.

(ii) Preferred Range

The carbon material of the present invention is considered to have a specific structure on its surface and develops a basic pH. The general natural graphite often develops acidity due to the presence of an acidic functional group existing on the surface, such as carboxyl group and phenolic hydroxyl group. The carbon material of the present invention is thought to develop its property because the above-described acidic functional group is structurally changed into a basic functional group such as chromene group upon heat treatment. Also, if the later-described heat treatment temperature is less than the lower limit, the pH is almost the same as that of the raw material graphite, whereas if it exceeds the upper limit, the acidic functional group is removed and therefore, the pH is substantially neutral.

The water slurry of the carbon material of the present invention preferably has a pH of 7.5 to less than 11, more preferably 10 or less, still more preferably 9 or less. If the pH exceeds 11, this incurs gelling of an aqueous carboxyl methylcellulose solution used when producing a negative electrode sheet.

[Scanning Electron Microscope (SEM) Measurement]
(i) Measuring Method

The scanning electron microscope (SEM) measurement can be performed by a conventionally known method. Specifically, for example, using a scanning electron microscope (VE-7800, manufactured by Keyence), particles are sparsely dispersed on an electrically conductive tape attached on the sample stage and observed in vacuum at an accelerating voltage of 5 kV.

(ii) Preferred Particle Morphology

In the carbon material of the present invention, the particle observed by SEM preferably has a morphology giving a spherical shape as a whole. Examples of the raw material capable of easily developing the specific structure shown by the carbon material of the present invention after the later-described heat treatment include various ground discotic graphite particles obtained by grinding round the edge of spherical, ellipsoidal or scale graphite, and above all, a natural graphite particle is preferred. Although artificial scale graphite having a particle diameter of 9 μm, a tap density of 0.24 g/cm$^3$ and a raw material Raman R value of 0.09 was subjected to the later-described heat treatment, the Raman R value after the heat treatment at 900° C. was increased only to 0.13 and the charge acceptance was also not sufficiently enhanced.

[X-Ray Structural Analysis (XRD)]

Although this is not necessarily required, the indicator of specificity of the carbon material of the present invention includes 3R/2H that is an abundance ratio (rhombohedral/hexagonal) of hexagonal to rhombohedral crystals of graphite determined from X-ray structural analysis (XRD).

(i) Measuring Method

XRD can be performed by a conventionally known method. Specifically, for example, using an X-ray diffractometer (JDX-3500, manufactured by JEOL Ltd.) with a CuKα ray graphite monochrometer as the target under the conditions of an output of 30 kV, a divergence slit of ½° at 200 mA, a receiving slit of 0.2 mm and a scattering slit of ½°, the powder is filled directly in the sample plate and assuming that crystal peaks of 3R(101) and 2H(101) are present near 2θ=43.4° and near 2θ=44.5°, respectively, the peak integrated intensities are determined. The ratio therebetween is defined as the abundance ratio.

(ii) Preferred Range

The 3R/2H is scarcely changed even when the later-described heat treatment is performed, and this suggests that the structural change occurs mainly in the vicinity of the edge end face and the crystal structure in the graphite bulk is not greatly changed. The 3R/2H varies depending on the spheroidized graphite used but, for example, in the carbon material prepared in Example 1 of the present specification, the 3R/2H is 0.22 and remains at the value almost equal to that of the raw material graphite particle (0.23) and the crystal is present in a ratio of 30% or more in terms of abundance ratio. This is considered to have relevance to the charge acceptance. On the other hand, if the heat treatment temperature exceeds the later-described range, the 3R/2H rapidly decreases and becomes 0.00 when again heat treated, for example, at 3,000° C. In the case of scale graphite, the 3R/2H is typically as low as about 0.20 or less even after grinding proceeds to give a small particle diameter (for example, a particle diameter of 10.5 μm, a tap density of 0.23 and SA of 8.3) and therefore, this graphite is not suitable as the raw material of the carbon material of the present invention.

[Particle Diameter]
(i) Measuring Method

The particle diameter can be measured by a conventionally known method. Specifically, for example, 0.01 g of graphite composite particle is suspended in 10 mL of a 0.2 mass % aqueous solution of polyoxyethylene sorbitan monolaurate (for example, Tween 20 (registered trademark)) which is a surfactant, and the suspension is introduced into a laser diffraction/scattering particle size distribution measuring apparatus (LA-920, manufactured by HORIBA Ltd.) and irradiated with an ultrasonic wave of 28 kHz at a power output of 60 W for 1 minute. Thereafter, the diameter is measured as the volume-based median diameter and this is designated as d50.

(ii) Preferred Range

The carbon material of the present invention is not particularly limited in its particle diameter, but as for the range used, d50 is 50 μm or less, preferably 30 μm or less, more preferably 25 μl or less, and is 1 μm or more, preferably 4 μm or more, more preferably 10 μm or more. If the particle diameter exceeds 50 μm, a trouble in view of process, such as streaking, occurs in many cases when a polar plate is formed, whereas if it is less than 1 μm, the surface area becomes excessively large and this makes it difficult to suppress the activity with an electrolytic solution.

In the carbon material of the present invention, d50 is sometimes increased with respect to the raw material graphite particle. The ratio of change in d50 of the graphite after heat treatment is preferably from 5 to 15% as compared with d50 of the raw material graphite particle. The phenomenon above is intensively observed in a graphite particle subjected to spheroidization or a graphite particle subjected to strong grinding to a small particle size of 10 μm or less in terms of d50 and at the same time, subjected to spheroidization, and therefore, it is considered that distortion produced in the course of grinding or spheroidization is eliminated and released due to heat and this contributes to the phenomenon above and in turn, provides an effect of enhancing the diffusion of Li into fine graphite particles constituting the spheroidized graphite.

[Total CO Generation Amount by Temperature-Programmed Desorption Method (TPD-MS)]

(i) Measuring Method

The total CO generation amount on the surface of the raw material graphite particle of the carbon material of the present invention can be measured by TPD-MS (Temperature Programmed Desorption & Decomposition Mass-Spectroscopy; temperature-programmed desorption method). The temperature-programmed desorption method is a technique of measuring the trace gas components generated/desorbed when heating the sample, the generation amount and the generation temperature and analyzing the chemical properties of the sample, and a conventionally known method may be employed. Specifically, for example, using a TPD-MS analyzer (AGS-7000, manufactured by ANELVA Corporation), the amount of CO gas (m/z=28) generated when He is used as the carrier gas and the temperature is raised from room temperature to 1,000° C. is analyzed by the mass spectrometer. Based on the area obtained resulting from the analysis, quantitative determination is performed using the standard calibration curve of each gas, whereby the total CO generation amount of the raw material graphite particle is obtained.

(ii) Preferred Range

The total CO generation amount per 1 $m^2$ as determined by TPD-MS measurement and the above-described SA measurement, that is, "the amount of a CO group present on the surface normalized by the BET specific surface area", of a graphite particle as the raw material of the carbon material of the present invention is preferably 0.4 $\mu$mmol/$m^2$ or more, more preferably 1.0 $\mu$mol/$m^2$ or more, and is preferably 3.5 $\mu$mol/$m^2$ or less, more preferably 1.5 mmol/$m^2$ or less. If the amount of CO gas generated from the graphite particle exceeds 3.5 $\mu$mol/$m^2$, the heat treatment is insufficient and a large change may not occur in the carbon structure on the outermost surface of the particle, whereas if it is less than 0.4 $\mu$mol/$m^2$, the crystal structure may proceed excessively.

[Raw Material]

The raw material of the carbon material of the present invention is not particularly limited as long as it is a graphitized carbon particle, but examples thereof include natural graphite, artificial graphite, coke powder, needle coke powder and graphitized resin powder. Among these, natural graphite is preferred, and spherical graphite obtained through spheroidization is more preferred. The spherical graphite is preferably composed of a plurality of curved or bent graphite scales or flakes, or a graphite fine powder obtained by grinding. Also, graphite obtained by grinding round the edge of ellipsoidal or scale graphite may be used. Graphite subjected to an oxidation treatment in addition to a spheroidization treatment may be further heat-treated. In this case, a prolonged mechanical grinding treatment may be further additionally applied to spheroidized graphite that becomes the raw material, or the graphite may be subjected to a contact treatment with an oxygen gas or a heated sulfuric acid, nitric acid or hydrochloric acid. The heat treatment also includes firing in air, a plasma treatment, and an ozone treatment.

In the carbon material of the present invention, a spherical or spheroidal natural graphite particle with a tap density≥0.6 g/$cm^3$ or more is preferably used as the raw material. If the tap density of the raw material graphite particle is less than 0.6 g/$cm^3$, poor charge acceptance results in view of geometric profile or the carbon material of the present invention fails in sufficiently exerting its effects as described above. Incidentally, the tap density is measured by the above-described method.

The raw material graphite particle of the carbon material of the present invention preferably has SA of 11 $m^2$/g or less, more preferably 8.5 $m^2$/g, and most preferably 6 $m^2$/g or less, and preferably 2.5 $m^2$/g or more, more preferably 3 $m^2$/g or more, and most preferably 4 $m^2$/g or more. If SA exceeds 11 $m^2$/g, reactivity with an electrolytic solution is excessively high and the irreversible capacity increases, whereas if it is less than 2.5 $m^2$/g, the entrance/exit of Li is prevented and the charge acceptance is poor.

The raw material graphite particle of the carbon material of the present invention preferably has a Raman R value of 0.05 or more, more preferably 0.1 or more, and most preferably 0.2 or more, and preferably 0.5 or less, more preferably 0.4 or less, and most preferably 0.3 or less. If the Raman R value is less than 0.05, the activity in the edge end face of graphite is small and the effects of the present invention may not be sufficiently obtained after heat treatment, whereas if it exceeds 0.5, even when heat-treated, insufficient graphite crystallinity or too high surface area may result or the reversible capacity or irreversible capacity may be poor.

The half width $\Delta v_D$ of D band obtained by measuring the Raman spectrum of the graphite particle used as the raw material of the carbon material of the present invention is preferably less than 55, more preferably less than 45. If $\Delta v_D$ is 55 or more, crystallinity as graphite may be lowered and the reversible capacity may decrease.

[Heat Treatment]

The carbon material of the present invention is produced by heat-treating the above-described graphite particle as the raw material in a given temperature range while taking time for the temperature to rise or drop. The range of the heat treatment temperature T is preferably 500° C.≤T<1,250° C., more preferably from 700 to 1,100° C., and most preferably from 800 to 1,050° C. If the temperature is less than 500° C., the functional group present in the outermost surface of the raw material graphite is not changed into a preferred structure and therefore, the effect of reducing the irreversible capacity is not sufficiently recognized, whereas if the temperature is 1,250° C. or more, the charge acceptance is lacking due to significant occurrence of recrystallization or removal of the surface functional group.

The time for which the heat treatment temperature of the carbon material of the present invention is kept is preferably 36 hours or more. If the heat treatment time is less than 36 hours, the above-described structural change is insufficient.

The carbon material of the present invention is sometimes obtained by loading or coating a carbon precursor such as pitch, tar or resin on graphite and further heat-treating it at an appropriate temperature. However, in this case, the surface of graphite as the substrate is partially covered with the carbon precursor and therefore, depending on the selection of binder, the active surface allowing the entrance and exit of Li is reduced, leading to lack of rapid charge characteristics at an ordinary temperature.

Also, the carbon precursor stochastically attaches to the substrate graphite in the mixing stage of raw materials, and this makes it difficult to change the structure only in the graphite edge surface where Li enters or exits, as a result, depending on the site of attachment, excessive reactivity with an electrolytic solution may be brought about.

In the production process of the carbon material of the present invention, a carbon source except for graphite that becomes the raw material, such as pitch, is not used and therefore, homogeneous heat treatment can be achieved. Furthermore, the step of mixing raw materials can be omitted, which is advantageous in that the process is simple and the cost is low.

The heat treatment may be performed while flowing $N_2$ or by packing $N_2$ in a vessel used for the heat treatment while expelling the remaining air at the time of enclosing the material in the vessel. The vessel may contain air but in this case, a treatment temperature of 950° C. or more yields a good state of the surface functional group.

Incidentally, when the treatment is performed in detail by thermobalance in $N_2$, an increase in the weight is sometimes observed, and furthermore, the measurement by TPD-MS reveals that this increase is attributable to addition of $N_2$. This phenomenon is considered to be a remote cause of a basic pH that the material of the present invention develops, and the percentage weight increase is typically from 0 to 7 mass % based on the weight of the raw material graphite.

[Configuration of Lithium Ion Secondary Battery]

The lithium ion secondary battery produced using the carbon material of the present invention and a negative electrode sheet containing the material is composed of members required for battery configuration, such as a positive electrode, an electrolytic solution, a separator, a cylindrical, angular or laminate can, a large-size can for automobiles or stationary batteries, a housing, a PTC element, and an insulating plate, and selection of these members is not particularly limited as long as the purport of the present invention is observed.

The lithium ion secondary battery of the present invention usually comprises at least the following negative electrode containing the carbon material of the present invention as the active material, a positive electrode and an electrolyte.

[Negative Electrode and Negative Electrode Sheet]

The negative electrode is composed of a negative electrode sheet containing at least the carbon material of the present invention. In addition to the carbon material of the present invention, other conventionally known negative electrode carbon materials may be mixed to form the sheet. For example, when the carbon material is rolled to a high density of 1.6 g/cm³ or more, the particle may be deformed to inhibit diffusion and pass of Li on the polar plate surface. Therefore, a particle working out to a filler may be mixed so as to cause no material crush.

Examples of the negative electrode carbon material which can be mixed with the carbon material of the present invention include a composite graphite particle obtained by mixing a graphite particle (hereinafter sometimes referred to as a graphite particle L) with pitch and again graphitizing the mixture at a temperature of 2,000° C. or more, and a graphite-amorphous carbon composite particle obtained by mixing a graphite particle L with pitch and heat-treating the mixture at a temperature of 700 to 1,500° C. For the graphite particle L, a spheroidized graphite particle is preferably used, because diffusion of Li between particles is facilitated.

The apparatus used for mixing the carbon material of the present invention and another negative electrode carbon material is not particularly limited, but examples of the rotary mixer include a cylindrical mixer, a twin cylindrical mixer, a double conical mixer, a regular cubic mixer and a spade mixer, and examples of the fixed mixer include a helical mixer, a ribbon mixer, a Muller-type mixer, a Helical Flight-type mixer, a Pugmill-type mixer, a fluidized mixer, Theta Composer, Hybridizer and Mechanofusion.

The mixing ratio of the carbon material of the present invention and another negative electrode carbon material varies depending on the active material density of the negative electrode sheet used or the purpose, but the mixing ratio is preferably, in terms of mass ratio, from 4:6 to 9:1 for a density of 1.6 g/cm³, from 3:7 to 4:6 for a density of 1.7 g/cm³, and from 2:8 to 3:7 for a density of 1.8 g/cm³.

Also, a part of the active material constituting the negative electrode sheet may contain an alloy alloyable with Li, a silicide and a semiconductor electrode. Specifically, for example, Si, Al, Sn, SnSb, SnAs, SiO, SnO, $SnO_2$, SiC, a semiconductor obtained by incorporating an impurity such as B, N and P into diamond, and a composite alloy or nonstoichiometric oxide composed of such a substance may be considered.

The negative electrode sheet has a configuration composed of a current collector formed by coating an active material layer containing the carbon material of the present invention, a particle described above, a polar plate-forming binder, a thickener and an electrically conductive material. The active material layer is usually obtained by coating a current collector with a slurry prepared from these members except for a current collector, drying the coating and rolling it to a desired density.

As for the polar plate-forming binder, an arbitrary material may be used as long as it is stable to a solvent or electrolytic solution used at the battery production. Examples thereof include polyvinylidene fluoride, polytetrafluoroethylene, polyethylene, polypropylene, styrene/butadiene rubber, isoprene rubber, butadiene rubber, an ethylene-acrylic acid copolymer, and an ethylene-methacrylic acid copolymer. The polar plate-forming binder is used in a ratio of, in terms of the mass ratio of negative electrode material/polar plate-forming binder, usually 90/10 or more, preferably 95/5 or more, and usually 99.9/0.1 or less, preferably 99.5/0.5 or less.

Examples of the thickener include carboxymethyl cellulose, Na salt and ammonium salt thereof, methyl cellulose, hydroxymethyl cellulose, ethyl cellulose, hydroxypropyl cellulose, polyvinyl alcohol, starch oxide, starch phosphate and casein. These thickeners may be used without limitation, but those undergoing no structural change such as gelling on the basic side are preferred.

Examples of the electrically conductive material include a fine metal powder material such as copper and nickel, and a small particle-size carbon material such as graphite and carbon black.

Examples of the material for the current collector include copper, nickel and stainless steel. Among these, a copper foil is preferred in view of easy formability into a thin film and cost.

The density of the active material layer varies depending on usage, but in the usage giving priority to the capacity, the density is usually 1.55 g/cm³ or more, preferably 1.60 g/cm³ or more, more preferably 1.65 g/cm³ or more, still more preferably 1.70 g/cm³ or more. If the density is too low, the battery capacity per unit volume is insufficient, whereas if the density is excessively high, the charge/discharge characteristics are deteriorated. For this reason, generally, in the case of a negative electrode sheet composed of only a carbon material, the density is preferably 1.90 g/cm³ or less. The "active material layer" as used herein indicates a mixture layer composed of an active material, a polar plate-forming binder, a thickener, an electrically conductive material and the like, on a current collector, and the density thereof indicates the bulk density of the active material layer at the time of assembling it into a battery.

In the present invention, when the carbon material of the present invention is used as an electrode active material of a lithium ion secondary battery and a negative electrode sheet is formed by the method described in Examples later, the ratio of irreversible capacity to SA measured by performing a sweep for three cycles with an Li counter electrode in the interelectrode potential difference range from 0 to 1.5 V while setting the active material density to 1.7 g/cm$^3$ is preferably 4.5 (mAh/m$^2$) or less.

For example, when the same negative electrode sheet is formed from raw material graphite not subjected to a heat treatment, the above-described ratio is usually from 4.8 to 5 (mAh/m$^2$), and the irreversible capacity for the same surface area is smaller in the case of using the carbon material of the present invention. Incidentally, this range is the result of measurement under the above-described sheet and charge/discharge conditions where the slurry contains an Na salt of carboxymethyl cellulose (CELLOGEN 4H, produced by Dai-ichi Kogyo Seiyaku Co., Ltd.) as a surfactant in a ratio of 1 mass % on the dry weight basis or a styrene butadiene rubber latex (BM400B, produced by ZEON Corporation) in a ratio of 1 mass % on the dry weight basis, per 98 mass % of the carbon material of the present invention as the active material.

The positive electrode is produced by forming an active material layer containing a positive electrode active material, an electrically conductive material and a polar plate-forming binder, on a positive electrode current collector. The active material layer is usually obtained by preparing a slurry containing a positive electrode active material, an electrically conductive material and a polar plate-forming binder, coating the slurry on a current collector, and drying the coating.

As for the positive electrode active material, there may be used a material capable of storing/releasing lithium, for example, a lithium-transition metal composite oxide material such as lithium cobalt oxide, lithium nickel oxide and lithium manganese oxide; a transition metal oxide material such as manganese dioxide; or a carbonaceous material such as graphite fluoride. Specific examples of the material which can be used include $LiFePO_4$, $LiFeO_2$, $LiCoO_2$, $LiNiO_2$, $LiMn_2O_4$, their nonstoichiometric compounds, $MnO_2$, $TiS_2$, $FeS_2$, $Nb_3S_4$, $Mo_3S_4$, $CoS_2$, $V_2O_5$, $P_2O_5$, $CrO_3$, $V_3O_3$, $TeO_2$ and $GeO_2$.

Examples of the electrically conductive material for the positive electrode include carbon black and small particle-size graphite.

As for the positive electrode current collector, a metal capable of forming a passivation film on the surface through anodic oxidation in an electrolytic solution, or an alloy thereof is preferably used, and examples thereof include metals belonging to Groups IIIa, IVa and Va (Groups 3B, 4B and 5B), and alloys thereof. Specific examples include Al, Ti, Zr, Hf, Nb, Ta and an alloy containing such a metal, and Al, Ti, Ta and an alloy containing such a metal can be preferably used. In particular, Al and an alloy thereof are preferred, because these are lightweight and in turn, assured of a high energy density.

Examples of the electrolyte include an electrolytic solution, a solid electrolyte and a gelled electrolyte. Among these, an electrolytic solution is preferred, and a nonaqueous electrolytic solution is more preferred. A nonaqueous electrolytic solution obtained by dissolving a solute in a nonaqueous solvent may be used.

Examples of the solute which can be used include an alkali metal salt and a quaternary ammonium salt. Specifically, for example, one or more compounds selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$ are preferably used.

Examples of the nonaqueous solvent include a cyclic carbonate such as ethylene carbonate, butylene carbonate and propylene carbonate; a cyclic ester compound such as γ-butyrolactone; a chain ether such as 1,2-dimethoxyethane; a cyclic ether such as crown ether, 2-methyltetrahydrofuran, 1,2-dimethyltetrahydrofuran, 1,3-dioxolane and tetrahydrofuran; and a chain carbonate such as diethyl carbonate, ethyl methyl carbonate and dimethyl carbonate. For each of the solute and the solvent, one kind may be selected and used, or two or more kinds may be mixed and used. Among these, a nonaqueous solvent containing a cyclic carbonate and a chain carbonate is preferred. Also, a compound such as vinylene carbonate, vinylethylene carbonate, succinic anhydride, maleic anhydride, propanesultone and diethylsulfone may be added thereto. Furthermore, an overcharge inhibitor such as diphenylether and cyclohexylbenzene may also be added.

The content of the solute in the electrolytic solution is preferably 0.2 mol/L or more, more preferably 0.5 mol/L or more, and is preferably 2 mol/L or less, more preferably 1.5 mol/L or less.

Above all, a lithium ion secondary battery produced by combining a negative electrode containing the carbon material of the present invention with a metal chalcogenide-based positive electrode and a carbonate-based solvent-containing nonaqueous electrolytic solution has a large capacity, is reduced in the irreversible capacity observed in the initial cycle and exhibits excellent rapid charge/discharge characteristics.

For preventing a positive electrode from coming into physical contact with a negative electrode, a separator is usually provided between the positive electrode and the negative electrode. The separator preferably has high ion permeability and low electric resistance. The material and shape of the separator are not particularly limited, but those stable to an electrolytic solution and excellent in the liquid retentivity are preferred. Specific examples thereof include a porous sheet and a nonwoven fabric, whose raw material is a polyolefin such as polyethylene and polypropylene.

The shape of the lithium ion secondary battery of the present invention is not particularly limited, and examples thereof include a cylinder type obtained by forming a sheet electrode and a separator in a spiral shape, a cylinder type with an inside-out structure obtained by combining a pellet electrode and a separator, and a coin type obtained by laminating a pellet electrode and a separator.

EXAMPLES

Specific embodiments of the present invention are described in greater detail below by referring to Examples, but the present invention is not limited to these Examples.

Preparation of Negative Electrode Carbon Material

Example 1

Particle P that is a spheroidized graphite particle having an average particle diameter of 22.2 μm, SA of 5.1 m$^2$/g, a tap density of 1.05 g/cm$^3$, a pH of 4.2, a Raman R value of 0.22, $\Delta v_D$ of 45 cm$^{-1}$ and O/C of 2.76 (hereinafter sometimes referred to as Graphite Particle P) was obtained. This spheroidized Graphite Particle P was filled in a graphite crucible and in an electric furnace, under an N$_2$ atmosphere, the temperature was raised from room temperature to 1,000° C. over 48 hours, held at 1,000° C. for 120 hours, and then lowered to near room temperature over 48 hours. From the obtained graphite particles, coarse particles were removed through a 45 μm sieve to obtain a sample.

Example 2

Graphite Particle P of Example 1 was filled in a graphite crucible and in an electric furnace, under a nitrogen atmosphere, the temperature was raised from room temperature to 1,000° C. over 48 hours, held at 1,000° C. for 120 hours, and then lowered to near room temperature over 48 hours. From the obtained graphite particles, coarse particles were removed through a 45-μm sieve to obtain a sample.

Example 3

Graphite Particle P of Example 1 was filled in a graphite crucible and in an electric furnace, under an $N_2$ atmosphere, the temperature was raised from room temperature to 700° C. over 24 hours, held at 700° C. for 36 hours, and then lowered to near room temperature over 24 hours. From the obtained graphite particles, coarse particles were removed through a 45-μm sieve to obtain a sample.

Example 4

Graphite Particle P of Example 1 was filled in a graphite crucible and in an electric furnace, under an $N_2$ atmosphere, the temperature was raised from room temperature to 850° C. over 24 hours, held at 850° C. for 36 hours, and then lowered to near room temperature over 24 hours. From the obtained graphite particles, coarse particles were removed through a 45-μm sieve to obtain a sample.

Example 5

Graphite Particle S having an average particle diameter of 10.4 μM, SA of 8.1 $m^2/g$, a tap density of 0.77 $g/cm^3$, a pH of 5.9, a Raman R value of 0.20, $\Delta v_D$ of 46 $cm^{-1}$ and O/C of 2.46 was filled in a graphite crucible and in an electric furnace, under a nitrogen atmosphere, the temperature was raised from room temperature to 1,000° C. over 48 hours, held at 1,000° C. for 120 hours, and then lowered to near room temperature over 48 hours. From the obtained graphite particles, coarse particles were removed through a 45-μm sieve to obtain a sample.

Example 6

The sample (30 mass %) obtained in Example 1 was mixed with 70 mass % of another negative electrode carbon material [a composite particle of carbonaceous materials starting from spherical natural graphite and pitch (particle diameter: 17 μm, 3.7 $m^2/g$, 1.15 $g/cm^3$)], and the obtained mixture was used as the sample of Example 6.

Comparative Example 1

Graphite Particle P of Example 1 was directly used as the sample for the measurements.

Comparative Example 2

In an electric furnace, under an $N_2$ atmosphere, Graphite Particle P of Example 1 was treated by raising the temperature from room temperature to 1,250° C. over 24 hours, holding it at 1,250° C. for 36 hours, and then lowering the temperature to near room temperature over 24 hours. From the obtained graphite particles, coarse particles were removed through a 45-μm sieve to obtain a sample.

Comparative Example 3

In an electric furnace, under an $N_2$ atmosphere, Graphite Particle P of Example 1 was treated by raising the temperature from room temperature to 350° C. over 24 hours, holding it at 350° C. for 36 hours, and then lowering the temperature to near room temperature over 24 hours. From the obtained graphite particles, coarse particles were removed through a 45-μm sieve to obtain a sample.

Comparative Example 4

Graphite Particle Q having an average particle diameter of 9.6 μm, SA of 8.9 $m^2/g$, a tap density of 0.25 $g/cm^3$, a pH of 6.2, a Raman R value of 0.11, $\Delta v_D$ of 45 $cm^{-1}$ and O/C of 2.23 was filled in a graphite crucible and in an electric furnace, under an $N_2$ atmosphere, the temperature was raised from room temperature to 900° C. over 36 hours, held at 900° C. for 36 hours, and then lowered to near room temperature over 36 hours. From the obtained graphite particles, coarse particles were removed through a 45-μm sieve to obtain a sample.

Comparative Example 5

In a graphitization furnace, Graphite Particle P of Example 1 was treated by raising the temperature from room temperature to 3,000° C. over 24 hours, holding it at 3,000° C. for 1 hour, and then lowering the temperature to near room temperature over 24 hours. From the obtained graphite particles, coarse particles were removed through a 45-μm sieve to obtain a sample.

[Evaluation of Physical Properties of Negative Electrode Carbon Material (Graphite Particle)]

The samples (graphite particle) obtained in Examples 1 to 6 and Comparative Examples 1 to 5 were evaluated for physical properties by the following methods. The results obtained are shown in Table 1.

(1) Particle Diameter d50

0.01 Gram of the sample was suspended in 10 mL of a 0.2 mass % aqueous solution of polyoxyethylene sorbitan monolaurate (for example, Tween 20 (registered trademark)) which is a surfactant, and the suspension was introduced into a commercially available laser diffraction/scattering particle size distribution measuring apparatus (LA-920, manufactured by HORIBA Ltd.) and irradiated with an ultrasonic wave of 28 kHz at a power output of 60 W for 1 minute. Thereafter, the diameter was measured as the volume-based median diameter and designated as d50.

(2) BET Specific Surface Area (SA)

This was measured using a specific surface area measuring apparatus (AMS8000, manufactured by Ohkura Riken Co., Ltd.) by a BET one-point method according to a nitrogen gas adsorption flow process. That is, 0.4 g of the sample was filled in the cell, pretreated by heating it at 350° C., then cooled to a liquid nitrogen temperature to cause saturated adsorption of a gas consisting of 30% of nitrogen and 70% of He, and heated to room temperature, and from the result obtained by measuring the amount of gas desorbed, the specific surface area was calculated by a normal BET method.

(3) Tap Density

Using a powder density measuring device (Tap Denser KYT-4000, manufactured by Seishin Enterprise Co., Ltd.), the cylindrical tap cell having a diameter of 1.6 cm and a volume capacity of 20 $cm^3$ was filled up with the sample falling through a sieve having a sieve opening of 300 μm and after tapping 1,000 times with a stroke length of 10 mm, the density was determined from the volume here and the weight of the sample and defined as the tap density.

(4) pH

300 Gram of the sample to be measured was charged into a 1 L-volume glass beaker together with 300 g in pure water, and these are mixed under boiling for 30 minutes. Once the sample was mixed with water, the slurry was left standing still and gradually cooled. After the temperature reached 25° C., a glass electrode for pH measurement was gently dropped in the supernatant solution, and the pH was measured.

(5) Transmission Electron Microscope (TEM)

A specimen obtained by dispersing the sample in ethanol was dropped on a grid and observed using a transmission electron microscope (JEM-2010, manufactured by JEOL Ltd.) under the condition of an accelerating voltage of 200 kV by taking notice of the edge portion. The presence or absence of a layer (irregular ringed structure) resulting from edge surfaces exposed to the carbon particle surface being connected with each other to form a U-shaped curved surface and the number of layers, which are recognized in the visual field at about 2,000,000 times by TEM, were observed.

(6) Raman R Value

Using a Raman spectrometer (NR-1800, manufactured by JASCO Corp.), the sample was caused to freely fall in the measurement cell to fill the cell with the specimen, and the measurement was performed under the following conditions while irradiating argon ion laser light in the measurement cell and rotating the measurement cell in a plane perpendicular to the argon ion laser light.

Wavelength of argon ion laser light: 514.5 nm
Laser power on sample: 20 mW
Resolution: 15 cm$^{-1}$
Measured range: from 1,100 to 1,730 cm$^{-1}$ Measurement of peak intensity, measurement of peak half width: background processing, smoothing processing (5 points in convolution as computed by a simple average)

The Raman R value was defined by the peak intensity ratio between the maximum peak (G band) in the vicinity of 1,580 cm$^{-1}$ and the maximum peak (D band) in the vicinity of 1,358 cm$^{-1}$, that is, $I_D/I_G$ (F. Tuinstra and J. L. Koenig, *J. Chem. Phys.*, 53, 1126 [1970]). Also, the half width of D band was designated as $\Delta v_D$.

The $\Delta G$ value is the half width of G band, and the $\Delta D$ value is the half width of D band.

(7) X-Ray Photoelectron Spectroscopy (XPS)

Using an X-ray photoelectron spectrometer (ESCA-5700, manufactured by ULVAC-PHI, Inc.), the sample was placed on the sample stage to give a flat surface and then subjected to multiplex measurement using a Kα-ray of aluminum, whereby C1s (from 280 to 300 eV) and O1s (from 525 to 545 eV) spectra were obtained. After charge correction by setting the peak top of C1s obtained to 284.3 eV, the peak areas of the C1s and O1s spectra were determined and further multiplied by an apparatus sensitivity coefficient to calculate the surface atomic concentration of each of C and O. The ratio between the atomic concentrations obtained (O/C: atomic concentration of O)/(atomic concentration of C) was calculated and defined as the amount of surface functional groups, O/C value, of the negative electrode material.

[Production of Negative Electrode Sheet]

Using the negative electrode carbon materials obtained in Examples 1 to 6 and Comparative Examples 1 to 5, a polar plate having an active material layer with an active material layer density of 1.70±0.03 g/cm$^3$ was produced. Specifically, 20.00±0.02 g of the negative electrode carbon material above, 20.00±0.02 g (0.200 g as solid content) of an aqueous 1 mass % carboxymethyl cellulose Na salt solution (CELLOGEN 4H, produced by Dai-ichi Kogyo Seiyaku Co., Ltd.) and 0.25±0.02 g (0.1 g as solid content) of an aqueous dispersion of styrene/butadiene rubber having a weight average molecular weight of 270,000 (BM400B, produced by ZEON Corporation) were stirred in a hybrid mixer manufactured by Keyence Corp. for 5 minutes and then defoamed for 30 seconds to obtain a slurry.

This slurry was coated in a width of 5 cm on a 18 μm-thick copper foil as a current collector by a doctor blade method to give a negative electrode material coverage of 11.0±0.1 mg/cm$^2$ and then air-dried at room temperature. After further drying at 110° C. for 30 minutes, the density of the active material layer was adjusted to 1.70 g/cm$^3$ by roll-pressing with a roller of 20 cm in diameter, whereby a negative electrode sheet was obtained.

[Evaluation of Negative Electrode Sheet]

The negative electrode sheet produced by the method above was measured for the reversible capacity, the charge/discharge irreversible capacity in the initial cycle and the charge-load capacity by the following methods. The results obtained are shown in Table 1.

(1) Reversible Capacity and Charge/Discharge Irreversible Capacity in Initial Cycle The negative electrode sheet produced by the method above was punched into a disk of 12.5 mm in diameter and used as the negative electrode, a 0.5 mm-thick metal Li foil punched out into the same size and pressure-bonded to a stainless steel plate was used as the counter electrode, and a bipolar cell was fabricated. Fabrication of the cell was performed in a dry box adjusted to a moisture value of 20 ppm or less, and a separator (made of a porous polyethylene film) impregnated with an electrolytic solution obtained by dissolving LiPF$_6$ in a mixed solvent of ethylene carbonate, ethyl methyl carbonate and dimethyl carbonate (volume ratio=25:30:30) to give a concentration of 1 mol/L was placed between the negative electrode and the positive electrode.

Normal charge/discharge includes charging to 350 mAh/g at 10 mVcut and 0.05 C (0.2 mA/cm$^2$) by cc charge in the first time, charging at 10 mV and 0.005 Ccut by cc-cv charge at the same current density in the subsequent second and third times, and discharging to 1.5 V at 0.05 C (0.2 mA/cm$^2$) in all times. The discharge capacity in the third cycle was taken as the reversible capacity, and the capacity obtained by subtracting the discharge capacity from the charge capacity in the first time was taken as the irreversible capacity (1st loss).

(2) Charge-Load Capacity

The rapid discharge test was performed under the condition of a discharge current of 0.2 C (0.8 mA/cm$^2$) or 2.0 C (8.0 mA/cm$^2$) after the normal charge/discharge test was applied for three cycles. The capacity was expressed by:

$$[2.0\ C(8.0\ mA/cm^2)]/[0.2\ C(0.8\ mA/cm^2)] \times 100(\%)$$

In the rapid charge test, the same electrolytic solution, separator and counter electrode were used except for producing the same bipolar cell as above in a dry air box at a relative humidity of 30%. This cell was subjected to the normal charge/discharge test for 3 cycles and then disposed in a constant-temperature chamber at 0° C., and the capacity (0° C. charge capacity) until the interelectrode potential difference became 0 V vs. Li was measured under the condition of 0.05 C (0.2 mA/cm$^2$) or 0.5 C (2.0 mA/cm$^2$) by cc charge.

TABLE 1

| | Physical Properties of Powder | | | | TEM Asymmetric Ringed Structure | Analysis Items | | | | Reversible Capacity (mAh/g) | 1st Loss (mAh/g) | 0° C. Charge Capacity/(mAh/g) | | | |
|---|---|---|---|---|---|---|---|---|---|---|---|---|---|---|---|
| | d50 (μm) | SA (m²/g) | Tap Density (g/cm³) | pH | | Raman R Value | ΔG Value | ΔD Value | XPS O/C | | | 0.05 C | 0.2 C | 0.5 C | 1 C |
| Example 1 | 23.1 | 5.5 | 1.09 | 9.4 | Observed, 2 layers | 0.30 | 21 | 44 | 0.24 | 368 | 22 | 315 | 166 | 41 | 9 |
| Example 2 | 23.1 | 5.5 | 1.09 | 9.6 | Observed, 2 layers | 0.28 | 21 | 44 | 0.32 | 368 | 22 | 313 | 165 | 42 | 9 |
| Example 3 | 22.3 | 5.3 | 1.09 | 9.2 | Observed, 2 layers | 0.33 | 23 | 44 | 0.62 | 367 | 31 | 304 | 134 | 29 | 7 |
| Example 4 | 23.1 | 5.5 | 1.09 | 9.3 | Observed, 2 layers | 0.30 | 22 | 44 | 0.77 | 366 | 25 | 311 | 150 | 33 | 8 |
| Example 5 | 10.7 | 8.8 | 0.83 | 9.0 | Observed, 2 layers | 0.24 | 23 | 44 | 0.54 | 365 | 40 | 302 | 140 | 16 | 5 |
| Example 6 | 18.1 | 5.2 | 1.11 | — | — | — | — | — | — | 364 | 24 | 305 | 156 | 26 | 7 |
| Comparative Example 1 | 22.2 | 5.1 | 1.05 | 4.2 | None | 0.22 | 22 | 45 | 2.76 | 365 | 34 | 300 | 150 | 28 | 6 |
| Comparative Example 2 | 21.7 | 5.3 | 1.10 | — | Observed, 3 layers | 0.14 | 21 | 49 | 0.64 | 364 | 24 | 296 | 136 | 25 | 6 |
| Comparative Example 3 | 9.6 | 8.9 | 0.25 | 6.0 | None | 0.12 | 27 | 54 | 1.60 | 362 | 41 | 302 | 132 | 16 | 6 |
| Comparative Example 4 | 10.5 | 8.2 | 0.23 | — | Observed, 2 layers | 0.14 | 28 | 39 | 0.88 | 358 | 45 | 298 | 128 | 13 | 5 |
| Comparative Example 5 | 23.1 | 4.5 | 1.10 | — | Observed, 4 layers | 0.03 | 19 | 44 | 0.69 | 366 | 25 | 299 | 117 | 22 | 5 |

As seen from Table 1, the negative electrode sheet containing the carbon material of the present invention as the negative electrode active material is small in the irreversible capacity in the initial cycle and exhibits excellent rapid charge/discharge characteristics (Examples 1 to 6).

INDUSTRIAL APPLICABILITY

The carbon material of the present invention is a particle ensuring that when the carbon material is contained as the active material in a negative electrode, the irreversible capacity in the initial cycle is small and the rapid charge/discharge characteristics can be responded to, and thereby can establish a negative electrode system capable of operating even when a polar plate sheet is prepared in a high density.

Also, the carbon material of the present invention can be easily and simply produced because of a small number of production steps in its production process. Furthermore, the carbon material can maintain rollability of the graphite material and in turn, can be coated on a current collector in a high density and be utilized as a negative electrode material when fabricating a high-capacity lithium ion secondary battery.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2008-282025) filed on Oct. 31, 2008, the entirety of which is incorporated herein by way of reference.

The invention claimed is:

1. A carbon material, having:
   (i) a tap density ≥ 0.75 g/cm³;
   (ii) a Raman R value ≥ 0.23 and a half width of D band $\Delta v_D < 45$ cm⁻¹, wherein the D band appears in the vicinity of 1,358 cm⁻¹ of the Raman spectrum; and
   (iii) 4 m²/g ≤ BET specific surface area SA, ≤ 11 m²/g, wherein the carbon material is suitable for a lithium ion secondary battery.

2. The carbon material of claim 1, wherein an element ratio of oxygen (O) to carbon (C) determined by X-ray photoelectron spectroscopy (XPS) is 0.03 < O/C ≤ 2.4.

3. The carbon material of claim 1, wherein a thickness of an amorphous carbon layer present on a basal surface exposed to a particle surface observed by a transmission electron microscope, TEM, does not exceed 50 nm.

4. The carbon material of claim 1, wherein a particle of the material, observed by TEM,
   has, in an edge portion, a structure comprising a single layer or maximally two layers, in which edge surfaces exposed to a particle surface are connected with each other to form a U-shaped curved surface, and
   has a fine folded structure irregular in an a-axis direction.

5. The carbon material of claim 1, wherein pH of the water slurry is 7.5 or more and less than 11.

6. The carbon material of claim 1, wherein a particle of the material, observed by a scanning electron microscope (SEM), is natural graphite giving a spherical shape as a whole, and
   the particle observed by TEM has, in the edge portion, a structure comprising a single layer or maximally two layers in which edge surfaces exposed to a particle surface are connected with each other to form a U-shaped curved surface, and has a fine folded structure irregular in the a-axis direction.

7. The carbon material of claim 1, wherein
   the Raman R value is not less than the Raman R value of a raw material graphite particle, and
   Rr, which is the Raman R value of the carbon material/Raman R value of the raw material graphite particle, is 1.0 < Rr ≤ 1.5.

8. The carbon material of claim 1, wherein
   the half width $\Delta v_D$ of D band appearing in the vicinity of 1,358 cm⁻¹ of the Raman spectrum is not more than the half width $\Delta v_D$ of D band of a raw material graphite particle, and
   a ratio $\Delta v_D r$ therebetween, $\Delta v_D$ of the carbon material/$\Delta v_D$ of the raw material graphite particle, is $\Delta v_D r ≤ 0.99$.

9. The carbon material of claim 1, wherein
the BET specific surface area, SA, is larger than SA of a raw material graphite particle,
the ratio SA_r therebetween, SA of the carbon material/SA of the raw material graphite particle, is $1.03 \leq SA\_r \leq 1.5$,
the tap density is larger than the tap density of the raw material graphite particle, and
a ratio Tap_r therebetween, tap density of said carbon material/tap density of the raw material graphite particle, is $1.01 \leq Tap\_r \leq 1.3$.

10. The carbon material of claim 1, obtained by heat-treating a spherical or spheroidal natural graphite particle having a tap density$\geq 0.6$ g/cm$^3$ in N$_2$,
wherein after the heat treating, a weight increase occurs due to an N$_2$ addition reaction.

11. The carbon material of claim 10, wherein a heat treatment temperature T in the heat treating is $500°$ C.$\leq T < 1,250°$ C. and
a time for the heat treating is 36 hours or more.

12. The carbon material of claim 1, wherein a ratio of an irreversible capacity to the SA is 4.5 mAh/m$^2$ or less, in which the irreversible capacity is measured with the carbon material as an electrode active material of a lithium ion secondary battery and performing a sweep for three cycles with an Li counter electrode in an interelectrode potential difference range from 0 to 1.5 V while setting a density of the electrode active material to 1.7 g/cm$^3$.

13. The carbon material of claim 1, which has no amorphous carbon structure attributable to a heat-treated product of pitch, tar, or resin.

14. The carbon material of claim 1, wherein a raw material graphite particle thereof is a spherical natural graphite particle, and a total CO generation amount on a surface of the raw material graphite particle as determined by temperature-programmed desorption method, TPD-MS, measurement and SA measurement, is from 0.4 to 3.5 μmol/m$^2$.

15. A carbon material, comprising:
the carbon material of claim 1; and
a negative electrode carbon material other than that,
in a ratio of 2:8 to 9:1 by mass.

16. A negative electrode sheet, comprising the carbon material of claim 1 as a negative electrode active material.

17. A lithium ion secondary battery, comprising the negative electrode sheet of claim 16.

18. A lithium ion secondary battery, comprising:
a negative electrode comprising the carbon material of claim 1 in a negative electrode sheet;
a positive electrode; and
an electrolytic solution,
wherein an active material density of the negative electrode sheet is 1.6 g/cm$^3$ or more and the electrolytic solution comprises a chain carbonate.

19. The carbon material of claim 2, wherein a thickness of an amorphous carbon layer present on a basal surface exposed to a particle surface observed by a transmission electron microscope, TEM, does not exceed 50 nm.

20. The carbon material of claim 2, wherein a particle of the material, observed by TEM,
has, in an edge portion, a structure comprising a single layer or maximally two layers, in which edge surfaces exposed to a particle surface are connected with each other to form a U-shaped curved surface, and
has a fine folded structure irregular in an a-axis direction.

* * * * *